(12) United States Patent
Dams et al.

(10) Patent No.: US 7,748,896 B2
(45) Date of Patent: Jul. 6, 2010

(54) METHOD AND DEVICE FOR MEASURING THE TEMPERATURE OF A MOLTEN METAL BATH

(75) Inventors: Francis Dams, Kessel-Lo (BE); Frank Seutens, Sint Huibrechts Lille (BE); Robert Charles Whitaker, Derbyshire (GB)

(73) Assignee: Heraeus Electro-Nite International N.V., Houthalen (BE)

( * ) Notice: Subject to any disclaimer, the term of this patent is extended or adjusted under 35 U.S.C. 154(b) by 448 days.

(21) Appl. No.: 11/748,793

(22) Filed: May 15, 2007

(65) Prior Publication Data
US 2007/0268477 A1 Nov. 22, 2007

(30) Foreign Application Priority Data
May 19, 2006 (GB) ................. 0610011.9

(51) Int. Cl.
*G01K 1/00* (2006.01)
*G01K 5/00* (2006.01)
(52) U.S. Cl. .................. 374/139; 374/140; 374/131; 374/208
(58) Field of Classification Search ............. 374/139, 374/140, 131, 208
See application file for complete search history.

(56) References Cited

U.S. PATENT DOCUMENTS

| | | | | |
|---|---|---|---|---|
| 3,570,277 A | * | 3/1971 | Dorr et al. | ................. 374/131 |
| 4,093,193 A | * | 6/1978 | Cassidy et al. | ................. 266/87 |
| 4,216,028 A | * | 8/1980 | Kurita | ........................ 136/234 |
| 4,377,347 A | * | 3/1983 | Hanmyo et al. | ............. 374/139 |
| 5,585,914 A | * | 12/1996 | Yamasaki et al. | ............. 356/44 |
| 6,227,702 B1 | | 5/2001 | Yamada et al. | |
| 6,770,366 B2 | | 8/2004 | Riche et al. | |
| 2006/0114967 A1 | * | 6/2006 | Dams et al. | ................. 374/139 |
| 2006/0115205 A1 | * | 6/2006 | Cuypers et al. | ............... 385/12 |

FOREIGN PATENT DOCUMENTS

| | | |
|---|---|---|
| DE | 3712619 C2 | 8/1989 |
| DE | 19623194 C1 | 7/1997 |
| DE | 19916235 A1 | 9/2000 |
| JP | 7151918 A | 6/1995 |
| JP | 10-176954 A | 6/1998 |
| JP | 11-118607 A | 4/1999 |

\* cited by examiner

*Primary Examiner*—Gail Verbitsky
*Assistant Examiner*—Mirellys Jagan
(74) *Attorney, Agent, or Firm*—Panitch Schwarze Belisario & Nadel LLP

(57) ABSTRACT

A method is provided for measuring a temperature of a molten metal bath by an optical fiber surrounded by a cover. The optical fiber is immersed in the molten bath, and the radiation absorbed by the optical fiber in the molten bath is fed to a detector, wherein the optical fiber is heated when immersed in the molten bath. The heating curve of the optical fiber has at least one point $P(t_0, T_0)$, wherein the increase $\Delta T_1$ in the temperature T of the optical fiber over the time $\Delta t$ in a first time interval $t_0 - \Delta t$ up to the temperature $T_0$ is smaller than the increase $\Delta T_2$ in the temperature of the optical fiber over the time $\Delta t$ in an immediately following second time interval $t_0 + \Delta t$.

14 Claims, 5 Drawing Sheets

METHOD AND DEVICE FOR MEASURING THE TEMPERATURE OF A MOLTEN METAL BATH

BACKGROUND OF THE INVENTION

The invention relates to a method for measuring a parameter, in particular a temperature, of a molten bath, in particular a molten metal bath, by an optical fiber surrounded by a cover, the optical fiber being immersed in the molten bath and the radiation absorbed by the optical fiber in the molten bath being fed to a detector, wherein the optical fiber is heated when immersed in the molten bath. Furthermore, the invention relates to a device for measuring a parameter, in particular a temperature, of a molten bath, in particular a molten metal bath, with an optical fiber having a cover and a detector connected to the fiber, wherein the cover surrounds the fiber in a plurality of layers. Parameters in the sense of the invention may also be, for example, the height of the bath or the composition, in other words the proportion of components. It is also possible to measure in other molten baths, such as molten salt, cryolite or glass baths.

A method of this kind is known, for example, from Japanese patent application publication No. JP 11-118607. This describes how an optical fiber is used for measuring temperature in molten metal baths. The optical fiber is unwound from a spool and fed to the molten metal bath through a feed pipe. The radiation absorbed by the optical fiber is evaluated by a detector. Suitable optical fibers are known, for example, from Japanese patent application publication No JP 10-176954. The fiber described there is surrounded with a spacing by a metal tube. Arranged around the tube is a tube made of an insulating material, which in turn is surrounded by an outer metal tube. This structure prevents the inner metal tube from melting too quickly. The tube made of an insulating material contains carbon particles, so the inner metal tube does not melt until the corresponding tube portion is immersed in the molten metal bath. The fiber is immersed in the molten metal bath and tracked at a previously determined speed, so that it is possible to continue measuring, even if the tip of the fiber is destroyed. A similar optical fiber for measuring temperature is disclosed in Japanese patent application publication No JP 7-151918. Here, the optical fiber is surrounded by a protective metal tube surrounded by a layer of plastic material.

Furthermore, multi-layered wires are known, which are used in steelworks to introduce doping substances selectively into the molten steel bath (for example, in DE 199 16 235, DE 37 12 619, DE 196 23 194, U.S. Pat. No. 6,770,366).

BRIEF SUMMARY OF THE INVENTION

The object of the invention is to improve the measuring of parameters in molten baths using optical fibers.

The optical fiber is by nature heated when it is immersed in the molten bath or when it approaches the molten bath or the layer of slag above the molten bath (for example 1. on molten steel baths). The heating relates, in particular, to the tip or the immersion end of the optical fiber. The optical fiber, the light-conducting element of which is usually quartz glass, has to be regularly replaced where the tip is concerned, for example, in molten steel baths, as quartz glass cannot withstand the high temperatures of the molten steel bath for long. The method according to the invention correspondingly relates to the front part of the optical fiber in each case, which is immersed in the molten bath or a layer of slag above it. The heating curve of the optical fiber (which represents the increase in the temperature T as a function of the time t) has, according to the invention, at least one point $P(t_0, T_0)$, wherein the increase $\Delta T_1$ in the temperature of the optical fiber over the time $\Delta t$ in a first time interval $t_0 - \Delta t$ up to temperature $T_0$ is smaller than the rise $\Delta T_2$ of the temperature of the optical fiber over the time $\Delta t$ in an immediately following second time interval $t_0 + \Delta t$.

A temperature course of this kind means that from a particular point in time onwards the heating curve in principle has a bend (quasi discontinuity), at which the heating speed considerably increases compared with the previous course. It has been proved that a mechanical movement of the optical fiber or its immediate environment takes place, the magnitude of which depends on the size of the change in the heating speed and the shortness of the corresponding time interval. The greater the change in the heating speed and the smaller the time interval $\Delta t$ is, the greater is the mechanical movement of the fiber or its immediate environment at the time of this quasi erratic change in the heating curve. This movement assists the immersion of the optical fiber in the molten bath and the replacing of the tip of the optical fiber, which is practically pushed off by the suddenly arising movement (vibration), so a new end of the glass fiber, not yet damaged by high temperatures, can be tracked.

The increase $\Delta T_2$ in the temperature T after the second time interval $t_0 + \Delta t$ is at least 5 times, preferably at least 10 times, more preferably at least 20 times as large as the increase $\Delta T_1$ in the temperature in the first time interval $t_0 - \Delta t$. In particular, a 50 times or even better 100 times greater increase in the temperature in the second time interval is preferred. The duration $\Delta t$ of the two time intervals should advantageously be at the most 500 ms, preferably at the most 200 ms long.

It is appropriate that the temperature $T_0$ of the optical fiber allocated to the point in time $t_0$ between the two time intervals is a maximum of 600° C., preferably a maximum of 200° C., more preferably a maximum of 100° C. The temperature of the actual optical fiber in the narrower sense, in other words the temperature of the quartz glass should be considered in this. The lower this temperature $T_0$, on which the change in the heating speed is based, the stronger and more effective this change can be.

The speed at which the optical fiber is immersed in the molten metal bath or fed thereto corresponds to the speed at which the vitreous structure of its tip is destroyed, so new glass fiber material is constantly fed which is suitable for receiving and passing on radiation, without radiation losses arising owing to a destroyed fiber structure.

According to the invention, the device for measuring a parameter, in particular a temperature, of a molten bath, in particular a molten metal bath, with an optical fiber, having a cover, and a detector connected to the fiber, wherein the cover surrounds the fiber in a plurality of layers, is characterised in that one layer is designed as a metal tube and an intermediate layer arranged beneath it is formed from a powder or a fibrous or granular material, wherein the material of the intermediate layer surrounds the fiber in a plurality of separate parts. The feature according to which the material of the intermediate layer surrounds the fiber in a plurality of separate parts means in the sense of the invention that the construction in multiple parts exists in the operating state, in other words during or after immersion in the molten bath to be measured. In this case temperatures of at least 1000° C., preferably at least 1400° C., are encountered. In this state, a binding agent possibly used during manufacture between the parts of the intermediate layer is dissolved or burned, so the individual parts do not or largely no longer adhere to one another. The parts may form either small particles or else larger cohesive units, such as conglomerates or, for example, shells arranged round the fiber. The material of the intermediate layer is therefore not rigid overall but at least to a limited extent movable in itself.

An intermediate layer of this kind is heated during the immersion of the optical fiber in the molten metal bath or a layer of slag above it. It has surprisingly been proved that the combination of a metal tube and an intermediate layer arranged beneath it, made of a powder or a fibrous or granular material, results in this material of the intermediate layer suddenly expanding greatly during heating, from a particular point onwards, in a heating curve with the presence of gases, namely if the metal tube is heated so much that it can no longer withstand the pressure which arises inside the metal tube, because of the expansion of the gases of the intermediate layer conditional on heat. In this case, fast rising stresses form inside the metal tube, until it suddenly cracks or is destroyed in some other way, so that the cover of the optical fiber moves away from the fiber practically explosively. In general, the device according to the invention is characterised in that during or after the destruction of the metal tube, the intermediate layer very quickly disintegrates as a layer, its parts moving away from the fiber. In this way, on the one hand the optical fiber is very quickly and suddenly exposed to the molten metal bath at its immersed end and on the other hand the advance of the tip of the optical fiber into the molten metal bath is made considerably easier.

The intermediate layer is preferably formed of silicon dioxide, aluminium oxide or a material refractory to a molten steel bath or an inert material. The material of the intermediate layer is not rigid in itself, but the individual material particles are movable in respect of one another, so that on the one hand the cover with the optical fiber is as flexible as possible, and on the other hand the erratic nature of the bursting or releasing of this material is guaranteed. The cover may have an outer layer of metal, in particular of zinc, of ceramic paper, cardboard or plastic material.

The cover preferably has a vibrator or a vibrator is arranged on or next to the cover, to improve the release of the material of the cover from the optical fiber or the removal (breaking off) of the destroyed tip of the optical fiber. The vibrator may also be formed by the material of the intermediate layer, as it has been proved that the particles of the material of the intermediate layer move towards one another on heating, this movement taking place partially erratically, so vibrations arise within this material or within the intermediate layer.

The vibrator may be formed of a material forming gas between 100° C. and 1700° C. (e.g. plastic material or other material, which burns or gives off gas in this temperature range). It can also be appropriate that arranged between the vibrator and the cover there is an intermediate space which is smaller than the oscillation amplitude of the vibrator. In particular, if the vibrator is arranged outside the cover, it acts mechanically on the cover periodically, so that the vibration is optimally transmitted by these beats. A further advantageous option is that the outside of the cover has irregularities arranged in succession in the longitudinal direction, into which an obstacle arranged next to the cover acts, particularly on a fiber guiding device, so that when the optical fiber is advanced a vibration is generated.

Additionally, the optical fiber may be surrounded by a metal sleeve as an inner layer. The layers of the cover may be arranged directly against one another in each case, the layer on the inside preferably resting directly against the optical fiber. The metal tube of the cover and also the metal sleeve are advantageously made of steel, particularly if the device is used for measuring in a molten steel bath or a molten iron bath. In general, the melting point of the material of the metal tube or the metal sleeve should correspond to the melting point of the molten metal bath to be measured.

The device according to the invention has, generally speaking, a cover for the quartz glass fiber, which on immersion into the molten metal bath is discontinuously destroyed. In this way, the optical fiber is kept for a relatively long time at a very low temperature. From a particular temperature onwards the fiber is heated erratically to the equilibrium temperature in the molten metal bath, so that the measurement can then take place very quickly before the optical fiber or its end immersed in the molten metal bath is destroyed. By continuously tracking the fiber into the molten bath at the same speed at which its immersed end is destroyed, there is always usable fiber material available in the molten metal bath for measuring. The tip of the fiber is continuously destroyed, so that the erosion face of the fiber is practically stationary. For this purpose, the fiber or its immersion end should reach the bath temperature at the moment its degradation begins (this so-called critical speed is in this case therefore identical to the erosion speed at which the erosion face of the fiber moves). If the erosion speed is lower than the critical speed, the fiber is destroyed before it reaches the bath temperature.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
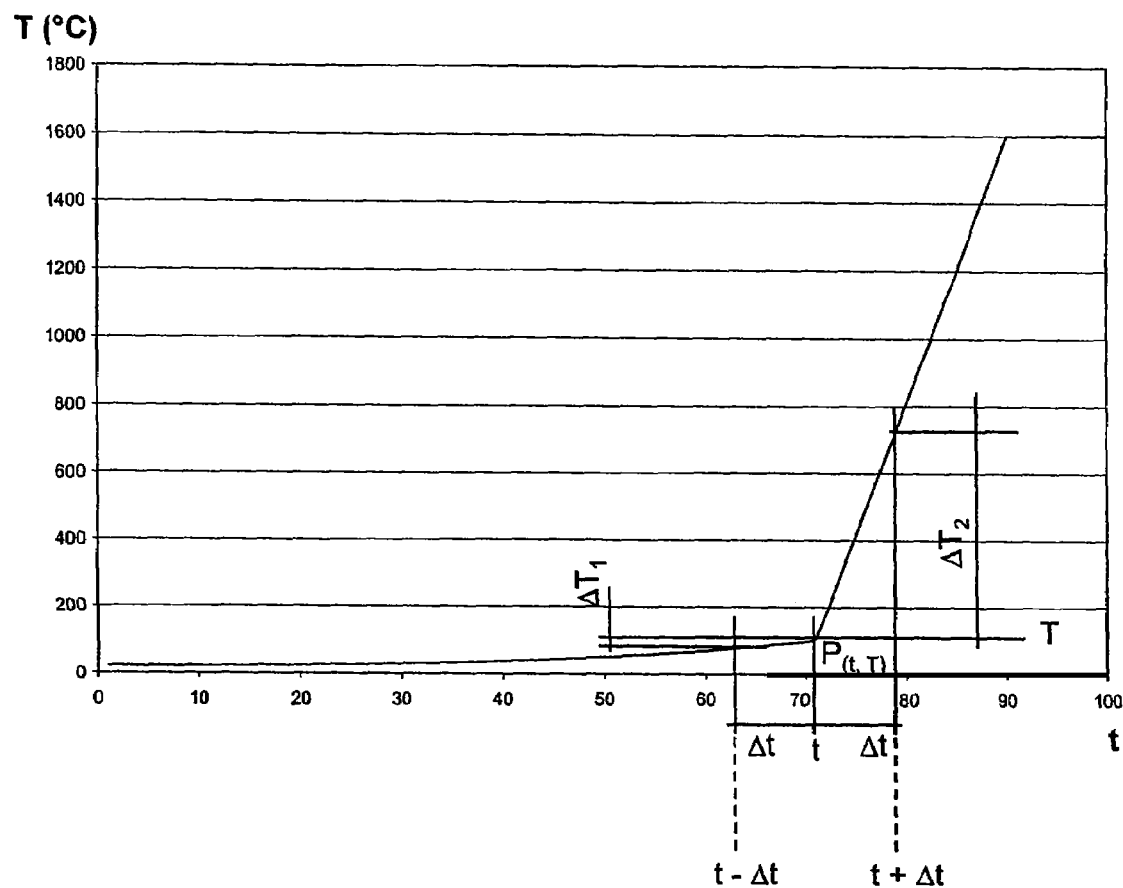
FIG. 1 is a graph shows a heating curve of an optical fiber plotting temperature against time for a method according to one embodiment of the invention, and illustrating the point where the change in heating speed occurs, as discussed above in the Brief Summary of the Invention section.

In FIG. 1 the temperature/time course is illustrated for the immersion of an optical fiber in a molten steel bath according to the method of the invention. The immersion speed of the quartz glass fiber with cover in the molten steel bath is equal to its destruction speed (erosion speed), so that the erosion face is quasi stationary in the molten metal bath. This speed corresponds to the critical speed, so that the optical fiber on its destruction face has reached the bath temperature.

Inside its covering the quartz glass fiber itself has only a very small increase in temperature over a long period of time. At a particular point in time its cover is suddenly removed, so that its temperature increases in a short time very steeply until it reaches the equilibrium temperature in the molten steel bath.

Figure 2:
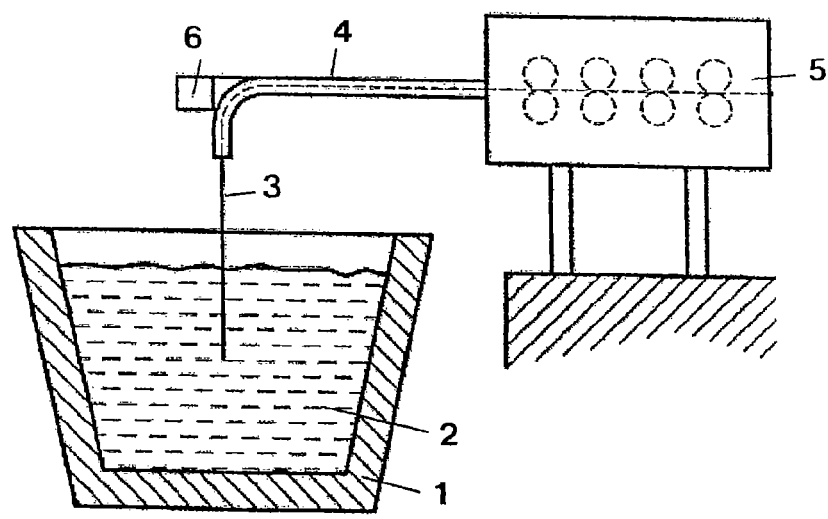
FIG. 2 is a schematic illustration of a device according to one embodiment of the invention.

In FIG. 2 a melting tub 1 with a molten steel bath 2 is illustrated. An optical fiber arrangement 3 is immersed in this bath. The optical fiber arrangement 3 has, above the molten metal bath, an outer covering 4, which serves for easier propulsion by a propulsion device 5. At the end of the covering 4 facing the molten steel bath 2 a vibrator 6 is arranged, which beats on the covering 4 at short intervals, so that the cover of the quartz glass fiber is suddenly destroyed by the vibration generated, as soon as it has reached a predetermined temperature. At this point the temperature of the outer steel cover is already very high, the powder arranged between the quartz glass fiber and the outer steel cover or the gas contained in the intermediate layer has greatly expanded and, assisted by the mechanical effect of the vibrator 6, explodes the steel cover which is under thermo-mechanical stresses in any case. As a result, the quartz glass fiber is immediately exposed to the temperature of the molten steel bath, so that it heats up extremely quickly to the equilibrium temperature. The intermediate layer is formed of silicon dioxide powder or aluminium oxide powder.

Figure 3:
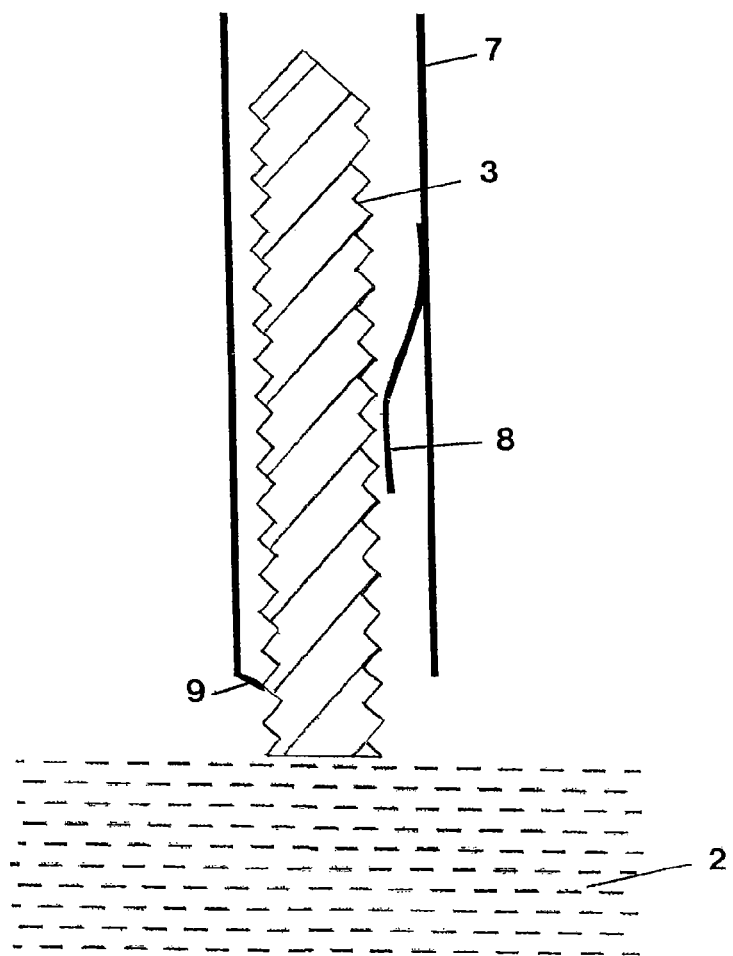
FIG. 3 is a schematic illustration of a mechanical vibration option for the device.

FIG. 3 shows an optical fiber arrangement 3 with a cover, which has on its outside irregularities arranged in succession in the longitudinal direction. The optical fiber arrangement 3 is guided by a guide sleeve 7, which has inside it a support element 8, along which the optical fiber arrangement 3 is guided. On the side of the optical fiber arrangement 3 opposite the support element 8 an edge of the guide sleeve 7 is tangent-bent inwardly, so that at this point it forms an obstacle 9. This obstacle 9 engages in the irregularities of the optical fiber cover, so that the optical fiber arrangement 3 is constantly vibrated during its advance movement.

Figure 4A:
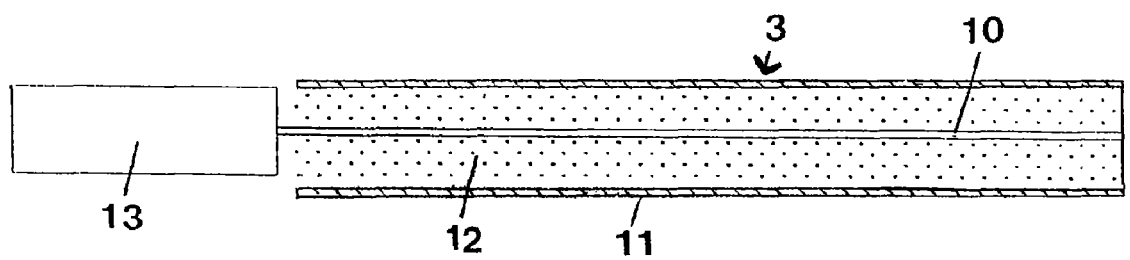
FIGS. 4a to 4c are schematic illustrations of the device according to different embodiments of the invention, each with detector.

FIG. 4a shows an optical fiber arrangement 3, in which the fiber 10, a quartz glass fiber, is surrounded by a steel tube 11. Inside the steel tube 11 is arranged an intermediate layer 12 made of aluminium oxide powder. The quartz glass fiber 10 is connected to a detector 13 at its end facing away from the immersion end of the optical fiber.

Figure 4B:
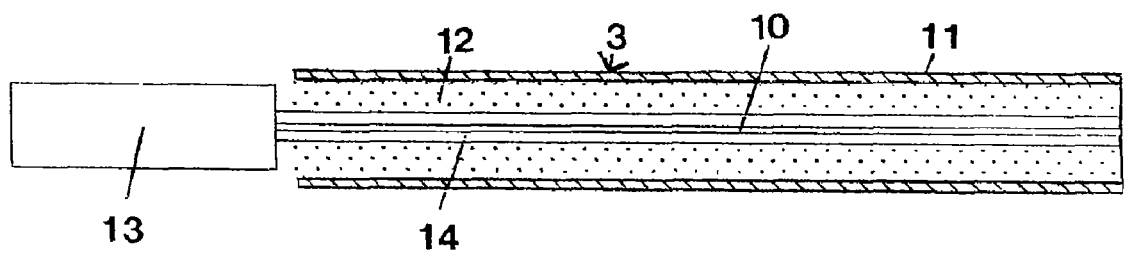

In FIG. 4b a similar arrangement is illustrated, and here the quartz glass fiber 10 is surrounded by a metal sleeve 14. Cooling gas can be conducted through the metal sleeve 14, which is guided out of the steel tube 11 at the detector-side end of the optical fiber arrangement 3, so that the quartz glass fiber 10 is additionally cooled.

Figure 4C:
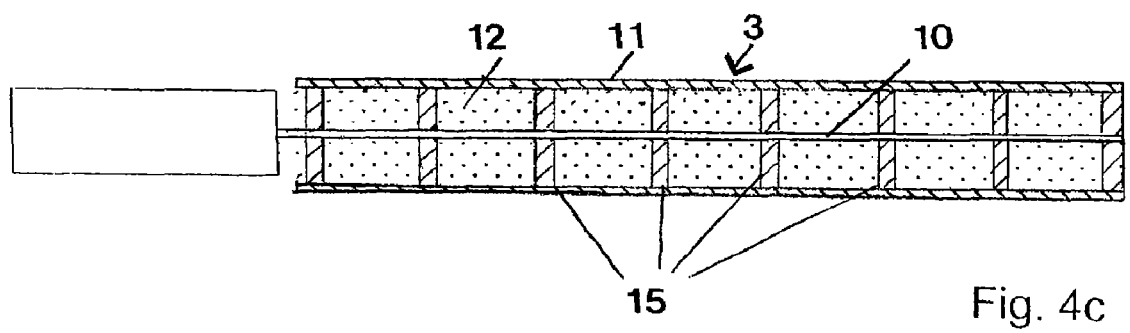

FIG. 4c shows an arrangement, likewise similar to FIG. 4a, of an optical fiber 3. The intermediate space between the steel tube 11 and the quartz glass fiber 10 is divided into a plurality of chambers with the aid of cardboard discs 15 arranged perpendicular to the optical fiber 10. The cardboard discs 15 serve on the one hand to stabilize the intermediate layer 12. They stabilize, in particular, the powder of the intermediate layer 12 during the destruction of the optical fiber arrangement 3, running in the longitudinal direction. On the other hand, during the burning of the cardboard discs 15, taking place because of the heating, an additional discontinuity/disruption is generated, which contributes to exposing the quartz glass fiber 10 quickly to the molten metal bath, so that it heats up very quickly after the destruction of the cover.

In FIGS. 5a to 5d several options are illustrated for stabilizing the quartz glass fiber 10 in the center of the cover of the optical fiber arrangement 3. According to FIG. 5a, the steel tube 11 is bent in such a way that it forms in one piece a concentrically arranged inner tube 16, which is connected to the outer steel tube 11 by a web 17 running along the cover. The outer steel tube 11 is welded together at a seam point 18 and has a wall thickness of approximately 0.5 mm. The quartz glass fiber 10 is arranged in the inner tube 16.

Figure 5A:
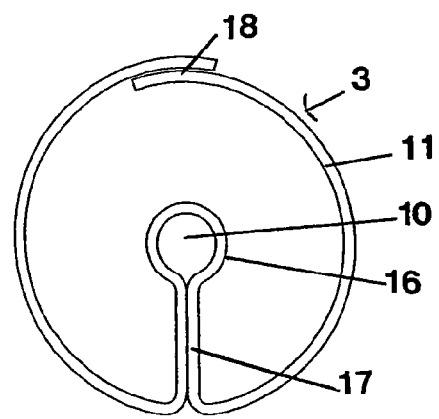
FIGS. 5a to 5d are schematic cross-sections of various embodiments of a fiber with a cover for the device.
Figure 5B:
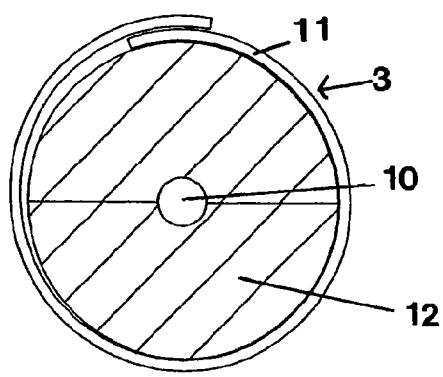

In the embodiment according to FIG. 5b the quartz glass fiber 10 is arranged centrally in the material of the intermediate layer 12.

Figure 5C:
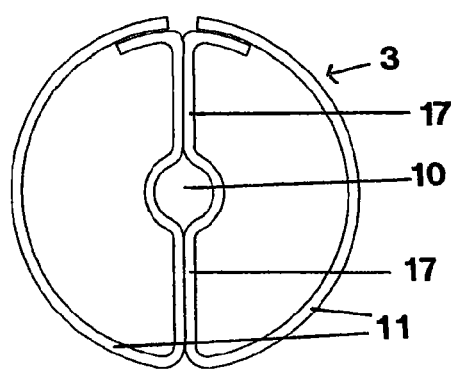

FIG. 5c shows a further embodiment of the optical fiber arrangement 3, similar to FIG. 5a. Here, though, the steel tube 11 is composed of two halves, in each case jointly forming two webs 17, by which the quartz glass fiber 10 is centrally locked.

Figure 5D:
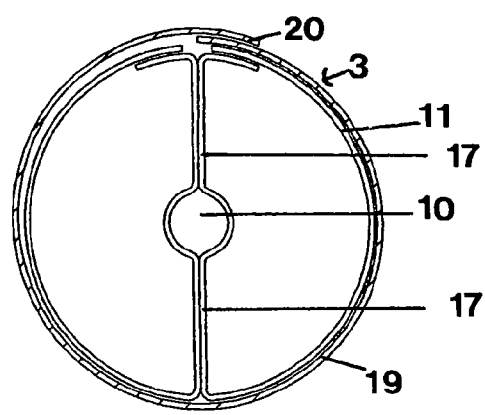

The embodiment according to FIG. 5d is similarly constructed. It additionally has a second outer steel tube 19, which holds together the steel tube 11 formed from two shells. The wall of the two steel tubes 11, 19 can be reduced correspondingly in respect of the other embodiments and amounts in each case to approximately 0.25 mm. A single welding at the seam point 20 is required.

Figure 6:
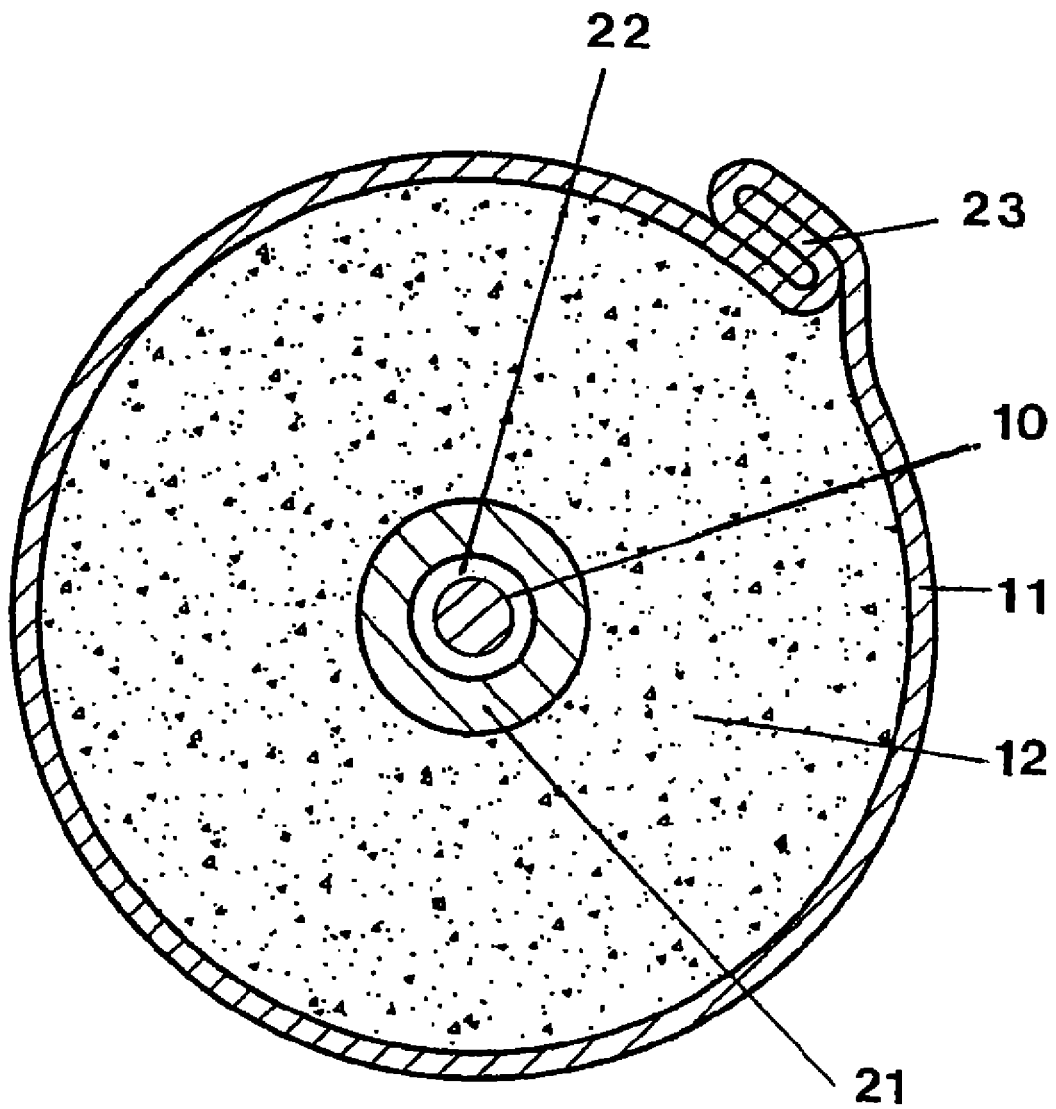
FIG. 6 is a detailed illustration of the fiber in cross-section.

FIG. 6 shows a fiber cross-section in detail. The quartz glass fiber 10 is surrounded at a minimal distance by a steel casing 21, so that different expansions of the two materials on heating are possible, and the quartz glass fiber 10 is nevertheless stabilized. Between the steel casing 21 and the steel tube 11 is arranged an intermediate layer 12 made of aluminium oxide particles. The steel tube 11 is rolled from a metal sheet and closed by a fold 23.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A device for measuring a parameter of a molten bath, the device comprising an optical fiber, a cover laterally surrounding the fiber, and a detector connected to the fiber, wherein the cover surrounds the fiber in a plurality of layers, one layer comprising a metal tube and an intermediate layer arranged beneath the metal tube, the intermediate layer comprising a powder or a fibrous or granular material, wherein the material of the intermediate layer surrounds the fiber in a plurality of pieces.

2. The device according to claim 1, wherein the parameter is a temperature of the molten bath.

3. The device according to claim 1, wherein the molten bath comprises a molten metal bath.

4. The device according to claim 1, wherein the intermediate layer comprises an inert material, silicon dioxide, aluminium oxide, or a material refractory to the molten bath.

5. The device according to claim 1, wherein the optical fiber is surrounded by a metal sleeve as an inner layer.

6. The device according to claim 1, further comprising an outer layer comprising metal, ceramic paper, cardboard or plastic material.

7. The device according to claim 6, wherein the metal of the outer layer comprises zinc.

8. The device according to claim 1, wherein the layers of the cover are arranged directly against one another.

9. The device according to claim 8, wherein an innermost one of the layers rests directly against the optical fiber.

10. The device according to claim 1, further comprising a vibrator arranged in, on or next to the cover.

11. The device according to claim 10, wherein the vibrator comprises a material which forms gas between 100° C. and 1700° C.

12. The device according to claim 10, wherein an intermediate space is arranged between the vibrator and the cover, the intermediate space being smaller than an oscillation amplitude of the vibrator.

13. The device according to claim 10, wherein the vibrator comprises irregularities arranged in succession in a longitudinal direction on an outside of the cover, and an obstacle arranged next to the cover, such that the obstacle engages the irregularities.

14. The device according to claim 13, wherein the obstacle is arranged on a fiber guide arrangement.

* * * * *